United States Patent [19]

Azem

[11] Patent Number: 5,422,947

[45] Date of Patent: Jun. 6, 1995

[54] TELEPHONE IN-USE INDICATOR

[75] Inventor: Khaled Azem, Alexandria, Va.

[73] Assignee: Design Tech International Inc., Springfield, Va.

[21] Appl. No.: 21,128

[22] Filed: Feb. 23, 1993

[51] Int. Cl.$^6$ ............................................. H04M 1/72
[52] U.S. Cl. .................................. 379/396; 377/162; 377/163; 377/164
[58] Field of Search ................. 379/396, 162, 163, 164

[56] References Cited

U.S. PATENT DOCUMENTS

| | | | |
|---|---|---|---|
| 3,951,248 | 4/1976 | Feiner et al. | 379/396 |
| 4,169,217 | 9/1979 | Szanto et al. | |
| 4,546,214 | 10/1985 | Laing | 379/396 |
| 4,647,723 | 3/1987 | Voorhies | |
| 4,723,279 | 2/1988 | Field | 379/396 |
| 4,726,048 | 2/1988 | Waldman et al. | 379/396 |
| 4,777,645 | 10/1988 | Faith et al. | 379/31 |
| 4,802,207 | 1/1989 | Uchida | |

OTHER PUBLICATIONS

Engineer's Notebook II, Integrated Circuit Applications, Forret M. Mims III, 1982 Archer.

*Primary Examiner*—James L. Dwyer
*Assistant Examiner*—Jacques M. Saint-Surin
*Attorney, Agent, or Firm*—Oblon, Spivak, McClelland, Maier & Neustadt

[57] ABSTRACT

A telephone in-use indicator having a diode bridge which is connected to a telephone line. The diode bridge ensures than an input signal from the telephone line is at a constant polarity. An inverter is connected to the diode bridge and receives a signal from the telephone line through the diode bridge. The inverter operates to invert the signal received from the telephone line. An oscillator receives a signal output from the inverter. A light emitting diode is connected to an output of the oscillator and is intermittently driven by the oscillator. A power source powers the inverter, oscillator and light emitting diode. When one telephone extension along the telephone line is changed from an "on-hook" to an "off-hook" condition, a drop in voltage is detected. As a result, the light emitting diode is intermittently driven by the oscillator to thereby provide an indication that a telephone line is in use.

14 Claims, 1 Drawing Sheet

TELEPHONE IN-USE INDICATOR

BACKGROUND OF THE INVENTION

1. Field of the Invention

The present invention is directed to a device which can indicate when a telephone line is being used, and more particularly, it will indicate when a telephone line is in use when a plurality of telephones are all set up to the same telephone line.

2. Discussion of the Background

When several telephone extensions are each connected to the same telephone line, it is useful to know when one telephone extension is being used so as to avoid picking up and interrupting a telephone call by picking up another telephone extension. In this way, a device for detecting such use of a telephone line may be used when it is desirable to tell if a common line is being used by any of the telephone extensions connected to it.

Several conventional telephone in-use indicators are known in the art. Typically, such telephone in-use indicators detect when a telephone line goes "off-hook", i.e., when one telephone extension is lifted up in preparation of placing a call. When a telephone line goes "off-hook" a low impedance is placed across the telephone line. This low impedance reduces the line voltage in an "on-hook" condition to a lower "off-hook" line voltage and also results in a significant increase in the line current. By detecting either this change in line voltage or this change in line current, it can be detected when a telephone goes "off-hook" and is thus in use. Conventional telephone in-use indicators will detect one of these conditions and thereby provide a visual indication that a telephone line is being used.

However, such conventional telephone in-use indicators suffer from several significant drawbacks. First, the conventional telephone in-use indicators typically use a complicated circuitry system to provide a telephone in-use indication. This results in complicated circuits which are costly. Further, conventional telephone in-use indicators place a load on a telephone line so that only a limited number of such conventional telephone in-use indicators can be applied to a single telephone line.

SUMMARY OF THE INVENTION

Accordingly, one object of the present invention is to provide a novel telephone in-use indicator which can overcome the above drawbacks of such conventional telephone in-use indicators.

More particularly, one object of the present invention is to provide a novel telephone in-use indicator which has a very simple circuitry and which is therefore low in cost.

Another object of the present invention is to provide a novel telephone in-use indicator which is self-powered so that it does not provide any load on a telephone line. As a result, by utilizing the telephone in-use indicator of the present invention as many telephone in-use indicators as are desirable can be applied to a single telephone line without loading down the telephone line.

The device of the present invention achieves these results by constructing a telephone in-use indicator having an input from a telephone line fed into a diode bridge. This diode bridge ensures that the input signal from the telephone line is maintained at a constant polarity. This input signal from the telephone line is then fed through the diode bridge into an inverter, which may be formed of a first NAND gate with its inputs tied together. An output from this inverter is then fed into an oscillator. This oscillator may be formed of a second NAND gate with one input receiving the output from the inverter and the other input being formed from a feedback from the output of the second NAND gate. Also connected to the output of this oscillator is a light emitting diode which will intermittently be driven by the oscillator to indicate when the telephone line is in-use. Further, the device of the present invention will be self-powered by an internal power source so as not to load down the telephone line.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
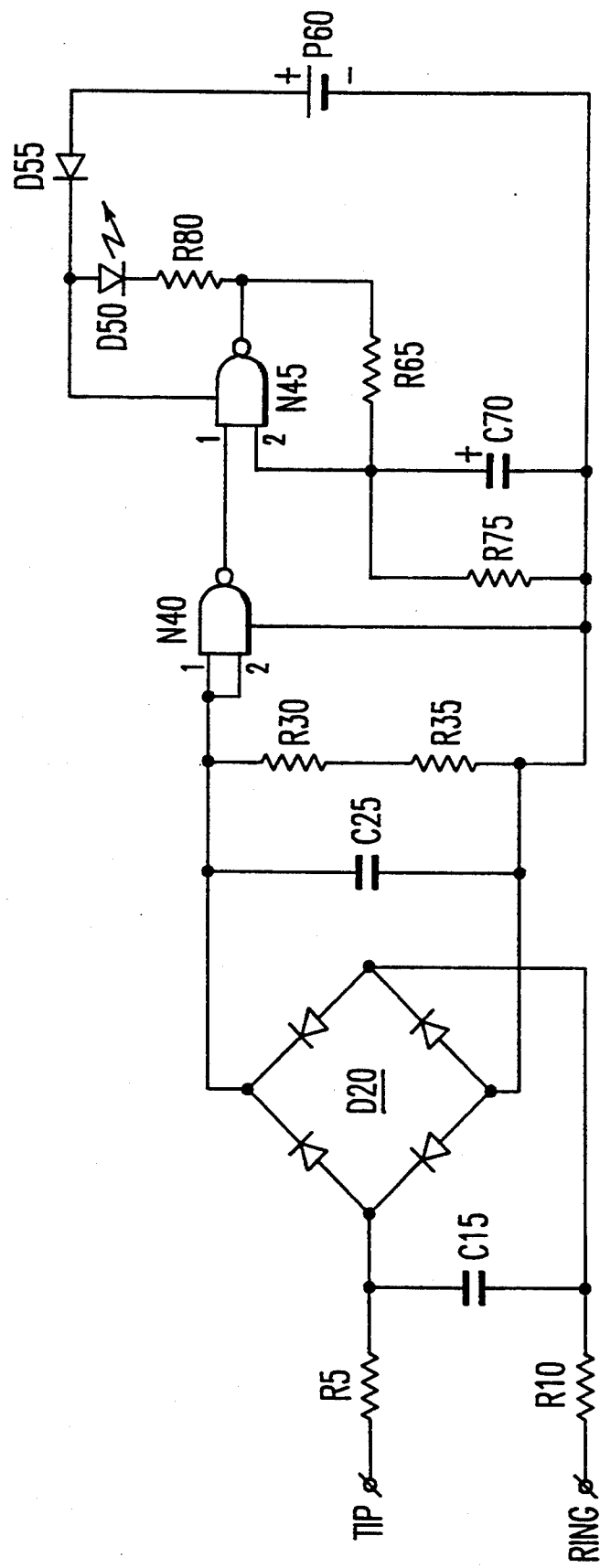
FIG. 1 details the telephone in-use indicator according to the present invention.

Referring now to FIG. 1, there is detailed the telephone in-use indicator according to the present invention.

As shown in FIG. 1, the Tip and Ring conductors of a telephone line are connected to a diode bridge D20 through respective resistors R5 and R10. Further, connected across the Tip and Ring conductors between resistors R5, R10 and the diode bridge D20 is a capacitor C15. An output from this diode bridge D20 is fed into an input of a first NAND gate N40. The two inputs to this first NAND gate N40 are tied together so that this first NAND gate N40 functions as an inverter. Also connected in parallel with this diode bridge D20 is a capacitor C25, and connected in parallel with this diode bridge D20 and capacitor C25 are resistors R30 and R35. Power to first NAND gate N40 is supplied from a power source P60, which may be a conventional 9 volt battery.

An output of the first NAND gate N40 is fed as one input to a second NAND gate N45, which second gate N45 may feature a Schmitt trigger. The other input to second NAND gate N45 is connected as a feedback loop from the output of second NAND gate N45 in series with a further resistor R65. Also connected between this second input of the second NAND gate N45 and the power source P60, in parallel, are capacitor C70 and resistor R75. At the output of second NAND gate N45 is a resistor R80 and a light emitting diode D50. The power supply to second NAND gate N45 is fed from power source P60 through a diode D55.

Operation of the device shown in FIG. 1 will now be described.

The Tip and Ring conductors of a telephone line are connected to the inputs of a diode bridge D20 through respective resistors R5 and R10. The diode bridge D20 operates to ensure that the voltage polarity of the signal fed to the inputs of first NAND gate N40 is constant independent of the line voltage polarity of the Tip and Ring conductors of the telephone line. Further, resistors R5 and R10 and R30, R35 operate as a voltage divider. Capacitor C15 operates to prevent electromagnetic interference, such as from radio stations, from causing undesirable audible interference. Capacitor C25 operates as a surge protector.

When all the telephone extensions along a telephone line are in an "on-hook" condition, a higher voltage signal will be detected at the Tip and Ring conductors than when one telephone extension along the telephone line is in an "off-hook" condition. This voltage will typically be 48 volts when the telephone extension is "on-hook" and drop to 9 volts when the telephone extension goes "off-hook". The operation of the voltage divider formed of resistors R5 and R10 and R30, R35 is to ensure that the voltage input into first NAND gate N40 is not too high. Values for these resistors which have been found to provide beneficial results are R5=4.7 MΩ, R10=4.7 MΩ, R30=2.1 MΩ and R35=390 KΩ, which then provides that the voltage input into NAND gate N40 is approximately 1.8 volts when the telephone extension is "off-hook" and 9.7 volts when the telephone extension is "on-hook". Further, typical values for capacitors C15 and C25 are C15=0.01 μF and C25=0.1 μF.

The first NAND gate N40 operates as an inverter, by reason of having its two inputs tied together. In this way, when the "on-hook" condition is detected the input to the first NAND gate N40 is a logical "high". As first NAND gate N40 operates as an inverter, its output will therefore be a logical "low" in this "on-hook" condition. Further, in this "on-hook" condition the input to the second NAND gate N45 at its first input will also be a logical "low". Therefore, in this "on-hook" condition, regardless of the other input to second NAND gate N45, the output of the second NAND gate N45 will be a logical "high". The voltage at the output of second NAND gate N45 in this case will be 9 volts, as supplied from the power source P60. As a result, no current will flow through the light emitting diode D50 as it will not be forwardly biased and the light emitting diode D50 will remain off.

Conversely, when one telephone extension along the telephone line is in an "off-hook" condition, the voltage across the Tip and Ring conductors will drop so that the input to the first NAND gate N40 will be a logical "low". As a result, the output of the first NAND gate N40 will be a logical "high". Thus, the first input to second NAND gate N45 will be a logical "high". At this time the input to the second input of second NAND gate N45 will also be a logical "high" as this second input is connected to power source P60. As a result, the output of second NAND gate N45 will be a logical "low". When this output of second NAND gate N45 goes to the logical "low" current will flow through the light emitting diode D50, i.e., current provided from the power source P60 will start to flow through light emitting diode D50. As a result, light emitting diode D50 will be illuminated indicating that one telephone extension of the telephone line is in the "off-hook" condition, i.e. that the telephone line is in-use.

Further, the output of the second NAND gate N45 will then alternate between a logical "low" and "high" because of the feedback loop, thereby operating to intermittently drive the light emitting diode D50 so that it will appear to blink. This results because when the output of second NAND gate N45 gate goes "low" to turn on the light emitting diode D50, the capacitor C70 will begin to discharge. When capacitor C70 does discharge, and then starts to become charged again, the second input into second NAND gate N45 will briefly go to a logical "low" while capacitor C70 is being charged. As a result, the output of second NAND gate N45 will briefly go to a logical "high", thereby preventing current from flowing through light emitting diode D50. This process will then continue so that light emitting diode D50 will turn intermittently on and off so as to blink. In this way, the operation of the second NAND gate N45 in conjunction with its feedback loop will provide the function of an oscillator. As a result, the light emitting diode D50 will appear to blink, i.e., be turned on and off intermittently, rather than provide a continuous lighting. This blinking indication aids in the visibility of the light emitting diode D50 and the indication that one telephone extension is in the "off-hook" condition and thus in-use and also serves to improve battery life.

Further, values for resistors R75 and R80 and capacitor C70 which have been found to construct the telephone in-use indicator of the present invention with beneficial results are R75=1.5 MΩ, R80=1 KΩ and C70=1 μF.

In this way, the device shown in FIG. 1 of the present invention operates as an effective telephone in-use indicator which is very simple in construction, thereby ensuring a low cost in the manufacture of such a device. Further, such a device according to the present invention is self-powered so that a plurality of such telephone in-use indicators can be applied across a single telephone line without loading down this telephone line.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A telephone in-use indicator, comprising:
    a voltage divider connected to a telephone line;
    a diode bridge connected to the telephone line through the voltage divider, for ensuring an input telephone signal from the telephone line is at a constant polarity;
    an inverter connected to the diode bridge for receiving the input telephone signal from the telephone line through the diode bridge, and for inverting the input telephone signal, wherein the inverter comprises a first NAND gate having first and second inputs which are tied together and an output;
    an oscillator for receiving an output from the inverter, wherein the oscillator comprises a second NAND gate having first and second inputs and an output for outputting a periodic signal, the first input receiving the output from the first NAND gate and the second input receiving a feedback signal from the output of the second NAND gate;
    a light emitting diode connected to the output of the second NAND gate of the oscillator and being intermittently driven by the periodic signal output by the oscillator; and
    a power source for powering the inverter, oscillator and light emitting diode.

2. The telephone in-use indicator according to claim 1, wherein the power source is self-contained in the telephone in-use indicator and is a 9-volt power source.

3. The telephone in-use indicator according to claim 1, wherein the power source is self-contained in the telephone in-use indicator and is a 9-volt power source.

4. The telephone in-use indicator according to claim 1, further comprising a capacitor connected to the second input of the second NAND gate which discharges when the light emitting diode emits light.

5. A telephone in-use indicator, comprising:
a voltage divider connected to a telephone line;
a diode bridge connected to the telephone line through the voltage divider, for ensuring an input telephone signal from the telephone line is at a constant polarity;
an inverter connected to the diode bridge for receiving the input telephone signal from the telephone line through the diode bridge, and for inverting the input telephone signal;
an oscillator for receiving an output from the inverter, wherein the oscillator comprises a NAND gate having first and second inputs and an output for outputting a periodic signal, the first input receiving a signal output from the inverter and the second input receiving a feedback signal from the output of the NAND gate;
a light emitting diode connected to an output of the oscillator and being intermittently driven by the periodic signal output by the oscillator; and
a power source for powering the inverter, oscillator and light emitting diode.

6. The telephone in-use indicator according to claim 5, wherein the power source is self-contained in the telephone in-use indicator and is a 9-volt power source.

7. The telephone in-use indicator according to claim 5, further comprising a capacitor connected to the second input of the second NAND gate which discharges when the light emitting diode emits light.

8. A telephone in-use indicator, comprising:
a voltage divider connected to a telephone line;
diode bridge means connected to the telephone line through the voltage dividing means, for ensuring an input telephone signal from the telephone line is at a constant polarity;
inverting means connected to the diode bridge means for receiving the input telephone signal from the telephone line through the diode bridge means, and for inverting the input telephone signal, wherein the inverting means comprises a first NAND gate having first and second inputs which are tied together and an output;
oscillating means for receiving an output from the inverting means, wherein the oscillating means comprises a second NAND gate having first and second inputs and an output for outputting a periodic signal, the first input receiving the output from the first NAND gate and the second input receiving a feedback signal from the output of the second NAND gate;
light emitting diode means connected to the output of the second NAND gate of the oscillating means and being intermittently driven by the periodic signal output by the oscillating means; and
power source means for powering the inverter means, oscillating means and light emitting diode means.

9. The telephone in-use indicator according to claim 8, wherein the power source means is self-contained in the telephone in-use indicator and is a 9-volt power source.

10. The telephone in-use indicator according to claim 8, wherein the power source means is self-contained in the telephone in-use indicator and in a 9-volt power source.

11. The telephone in-use indicator according to claim 8, further comprising a capacitor connected to the second input of the second NAND gate which discharges when the light emitting diode emits light.

12. A telephone in-use indicator, comprising:
voltage dividing means connected to a telephone line;
diode bridge means connected to the telephone line through the voltage dividing means, for ensuring an input telephone signal from the telephone line is at a constant polarity;
inverting means connected to the diode bridge means for receiving the input telephone signal from the telephone line through the diode bridge means, and for inverting the input telephone signal;
oscillating means for receiving an output from the inverting means, wherein the oscillating means comprises a NAND gate having first and second inputs and an output for outputting a periodic signal, the first input receiving a signal output from the inverting means and the second input receiving a feedback signal from the output of the NAND gate;
light emitting diode means connected to an output of the oscillating means and being intermittently driven by the periodic signal output by the oscillating means; and
power source means for powering the inverting means, oscillating means and light emitting diode means.

13. The telephone in-use indicator according to claim 12, wherein the power source means is self-contained in the telephone in-use indicator and is a 9-volt power source.

14. The telephone in-use indicator according to claim 12, further comprising a capacitor connected to the second input of the second NAND gate which discharges when the light emitting diode emits light.

* * * * *